(12) United States Patent
Natsume

(10) Patent No.: US 6,962,428 B2
(45) Date of Patent: Nov. 8, 2005

(54) VEHICULAR LAMP

(75) Inventor: Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 163 days.

(21) Appl. No.: 10/625,425

(22) Filed: Jul. 23, 2003

(65) Prior Publication Data

US 2004/0120160 A1 Jun. 24, 2004

(30) Foreign Application Priority Data

Jul. 24, 2002 (JP) ........................................ 2002-214724

(51) Int. Cl.[7] ................................................ F21V 7/00
(52) U.S. Cl. ...................... 362/545; 362/518; 362/241
(58) Field of Search ................................ 362/544, 545, 362/800, 241, 247, 521, 518, 249, 240, 245, 246, 297, 307, 308, 268

(56) References Cited

U.S. PATENT DOCUMENTS 5,929,788 A * 7/1999 Vukosic .................... 340/908.1
6,183,100 B1 * 2/2001 Suckow et al. ................ 362/35
6,234,648 B1 * 5/2001 Borner et al. ................ 362/235
6,471,371 B1 * 10/2002 Kawashima et al. ........ 362/235
6,682,211 B2 * 1/2004 English et al. .............. 362/545
6,857,769 B2 * 2/2005 Brun .......................... 362/517

FOREIGN PATENT DOCUMENTS

JP        2001-332104         11/2001

* cited by examiner

Primary Examiner—Thomas M. Sember
(74) Attorney, Agent, or Firm—Koda & Androlia

(57) ABSTRACT

A vehicular lamp including a first LED light source that faces the back of the lamp so that its light is reflected forward of the lamp by a reflector, thus providing soft lighting due to an indirect lighting effect, the lamp further including a second LED light source that is disposed, so as to face the front of the lamp, on the front side of a circuit board that supports the first LED light source. A cover member that covers the circuit board is disposed on the front side of the second LED light source, and the cover member is formed with diffusion lens elements, thus allowing light from the second LED light source to be diffused and transmitted forward of the lamp and letting a portion of the lamp, which corresponds to the second LED light source, to appear brilliantly.

9 Claims, 5 Drawing Sheets

VEHICULAR LAMP

BACKGROUND OF THE INVENTION

1. Field of the Invention

The present invention relates to a vehicular lamp having an LED (light-emitting diode) light source.

2. Prior Art

Recently, vehicular lamps with an LED light source have been widely adopted. In the vehicular lamp disclosed in Japanese Patent Application Laid-Open (Kokai) No. 2001-332104, LED light sources are arranged so that they are not seen from the outside of the lamp and light from the LED light sources is reflected forward of the lamp by a reflector.

By adopting such a configuration, the lamp provides a soft lighting effect due to indirect lighting effect.

In the vehicular lamp that uses only the indirect lighting effect as mentioned above, however, there are problems. The lamp when lit emits light somewhat in a flat manner, and the lamp does not appear to emit light from deep inside. Further, a sufficient light emission amount cannot be ensured.

SUMMARY OF THE INVENTION

The present invention is made in view of the foregoing circumstances, and it is an object of the present invention to provide a vehicular lamp in which the lamp appears as if it emits light from deep inside and a sufficient light emission amount is ensured.

More specifically, the present invention accomplishes the above-described object by a structure that includes an LED light source which is for direct lighting and a cover member as well as an LED light source which is for indirect lighting.

The above object is accomplished by a unique structure of the present invention for a vehicular lamp that includes at least one first LED light source provided to face the rear of the vehicular lamp and a reflector that reflects light from the first LED light source forward of the vehicular lamp; and in the present invention:

- at least one second LED light source that faces the front of the vehicular lamp is provided near the front side of a circuit board that supports the first LED light,
- a transparent cover member is provided near the front side of the second LED light source so as to cover not only a circuit board that supports the second LED light source but also the circuit board that supports the first LED light source, and
- a plurality of diffusion lens elements that diffuse and transmit light from the second LED light source are formed on the cover member.

The "second LED light source" is arranged in a complete back-to-back relationship with the first LED light source, and it can be arranged also to be offset from the position of the first LED light source.

The "diffusion lens elements" can be provided on the front side, the back side, or on both sides of the cover member. The specific configurations of each one of the "diffusion lens elements," such as the outer shape, surface shape and arrangement thereof is not particularly specified as long as the diffusion lens elements diffuse and transmit the light from the second LED light source.

As described above, in the vehicular lamp of the present invention, light from at least one first LED light source that is arranged to face the back of the lamp is reflected forward of the lamp by the reflector; at least one second LED light source is provided near the front side of the circuit board that supports the first LED light source, and a transparent cover member that covers the circuit board that supports the second LED light source and the circuit board that supports the first LED light source is provided near the front side of the second LED light source. In addition, the cover member is formed with a plurality of diffusion lens elements that diffuse and transmit light from the second LED light source. With this structure, the vehicular lamp of the present invention has several advantages.

First, since the light from the first LED light source is radiated forward of the lamp by being reflected by the reflector, the lamp provides soft lighting by indirect lighting effect. On the other hand, since the light from the second LED light source is radiated forward of the lamp as direct light transmitted through the plurality of diffusion lens elements of the cover member, a portion of the lamp that positionally correspond to the second LED appears brilliantly. However, since the position where the lamp appears brilliantly is at a distance from the reflector on the front side of the lamp, the lamp appear when lit in a stereoscopic manner, as if the light is coming from deep inside the lamp. Further, a sufficient light emission amount is ensured since light from both the first and second LED light sources is radiated toward the front of the lamp.

As seen from the above, according to the present invention, a vehicular lamp provided with LED light sources appears, when lit, as if it emits light from deep inside, and a sufficient light emission amount is ensured.

Further, since the cover member formed with a plurality of diffusion lens elements is employed, when the lamp is not lit, the presence of not only the second LED light source but also the first LED light source is hardly noticeable. Thus, it is difficult to expect the manner in which the lamp illuminates, and the manner in which the lamp appears changes unexpectedly when the lamp is turned on and off.

In the above-described structure, though separate circuit boards can be used for the first LED light source and for the second LED light source, a common or single circuit board can be used for both first and second LED light sources. This can reduce the number of parts and keep the space for the first and second LED light sources small.

Also, in the above-described structure, a plurality of first and second LED light sources can be provided in the same direction (for instance, in the vertical direction), and the cover member that has a substantially U-shaped cross section is provided so that it extends in the direction in which the first and second LED light sources are arranged (for instance, in the vertical direction). With this structure, a further increased light emission amount is obtained, and the circuit board for the first and second LED light sources can be formed in a simple rectangular shape.

Furthermore, the reflective surface of the reflector can be divided into two reflecting areas on both sides of a boarder line that extends substantially in parallel with the arrangement direction of the first and second LED light sources, and each of the reflecting areas can be further divided into a plurality of sub-reflective surfaces for each one of the first LED light sources. With this structure, light from each one of the first LED light sources can be controlled appropriately by the sub-reflective surfaces which are located on both sides of the LED light source, and more light flux toward the front of the lamp is ensured. Also, since each one reflecting area is divided into the plurality of sub-reflective surfaces for each one of the first LED light sources, each first LED light source illuminates twice as much on both sides of the cover member due to the sub-reflective surfaces.

In addition, by way of arranging the first and second LED sources alternatively along the arrangement direction thereof, when the lamp is viewed from the front, a portion where the lamp illuminates to provide a soft lighting effect and a portion that illuminates brilliantly appear alternatively. Thus, the lamp has unprecedented novelty in design.

DETAILED DESCRIPTION OF THE INVENTION

A description of the preferred embodiments of the present invention will be given below with reference to the accompanying drawings.

Figure 1:
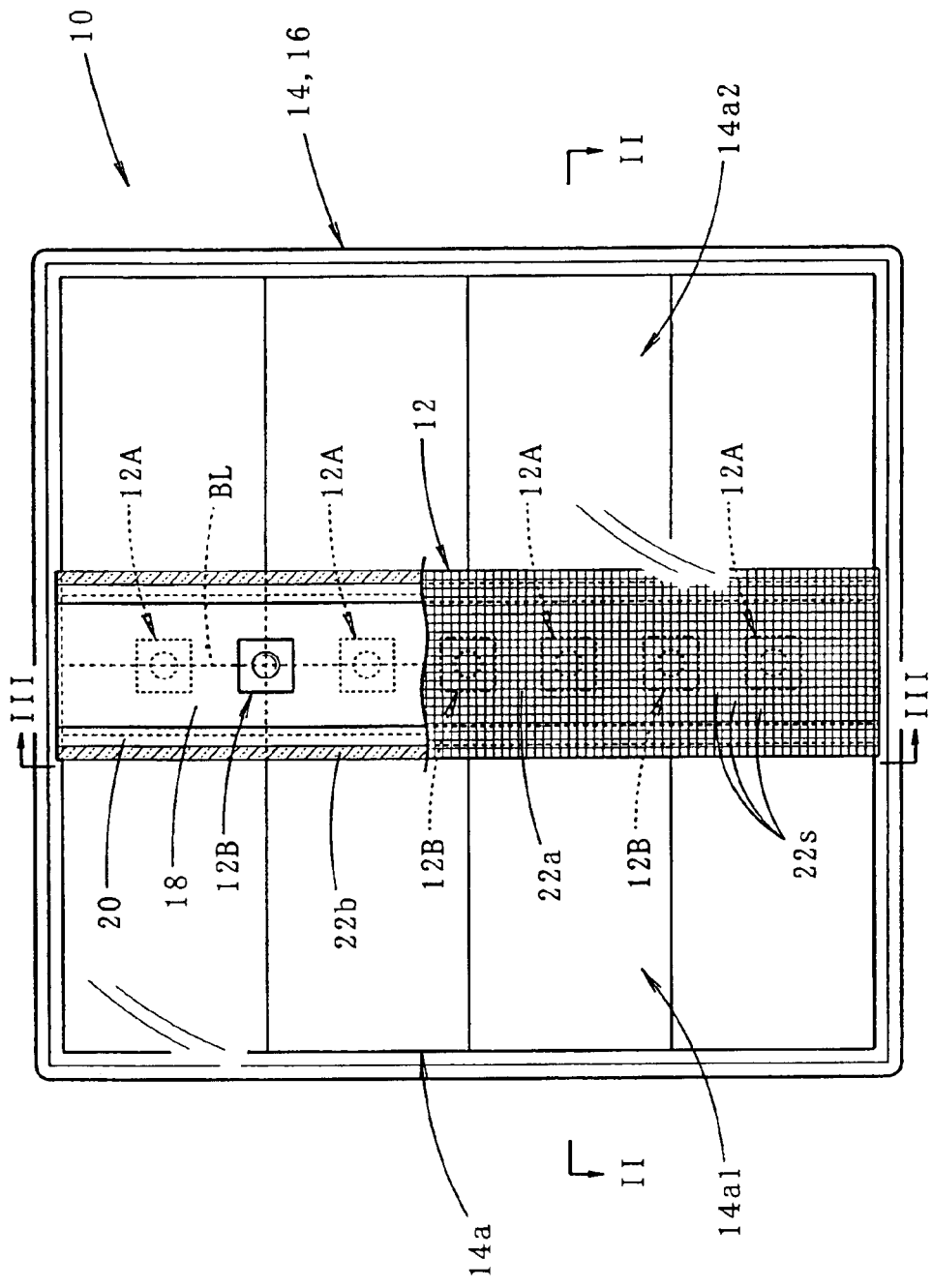
FIG. 1 is a front elevational view of the vehicular lamp according to one embodiment of the present invention.

As seen from FIGS. 1 through 3, the vehicular lamp 10 of the shown embodiment is a tail lamp that is mounted at a rear end portion of a vehicle, and it has four first LED light sources 12A, three second LED light sources 12B, a reflector 14 that reflects light from each of the first LED light sources 12A forward of the lamp (that is, rearward of a vehicle, the same terminology is applied in the following description), and a red translucent cover 16 provided on the reflector 14 at the front side of the lamp. The reflector 14 and the translucent cover 16 form a lamp chamber.

In this vehicular lamp 10, the first LED light source 12A provided at four locations and the second LED light source 12B provided at three locations illuminate simultaneously.

Figure 3:
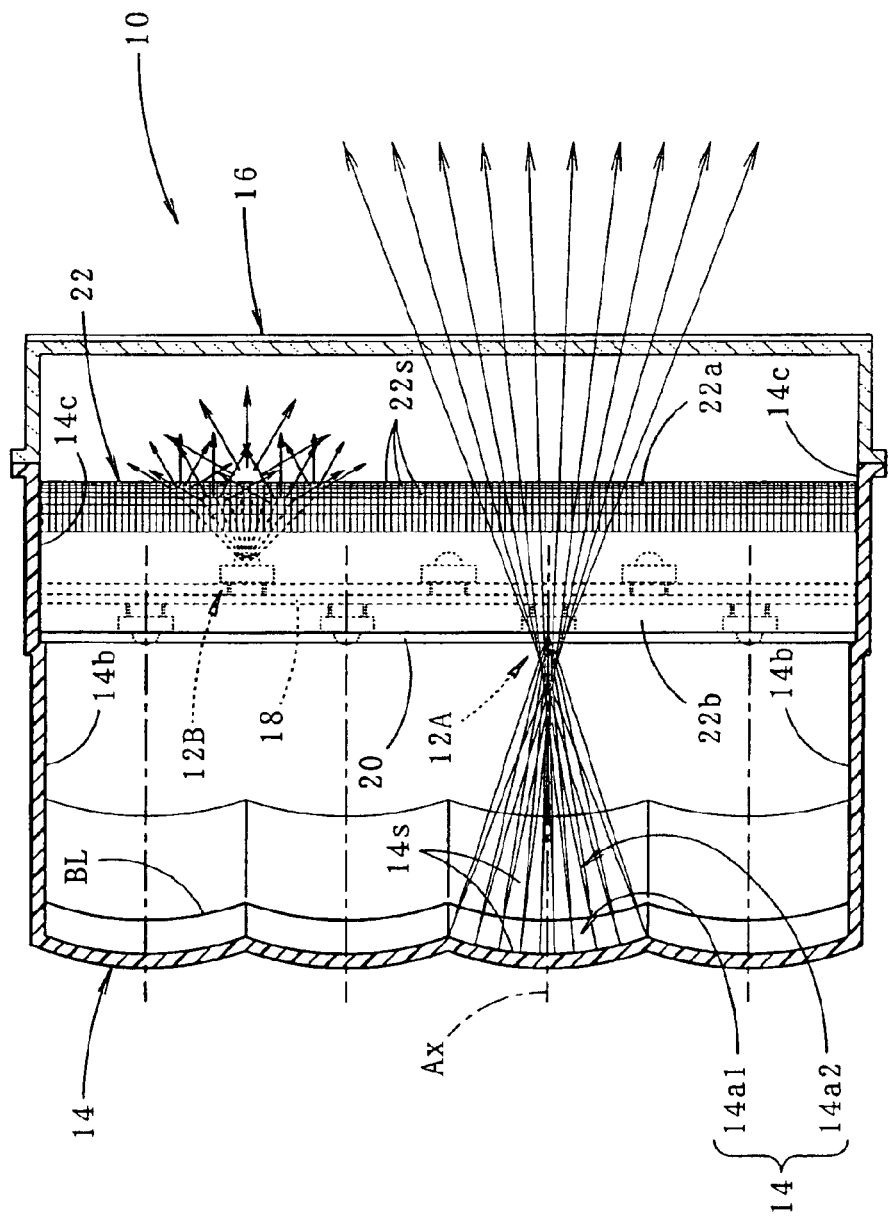
FIG. 3 is a cross sectional view taken along the line III—III in FIG. 1.
Figure 4:
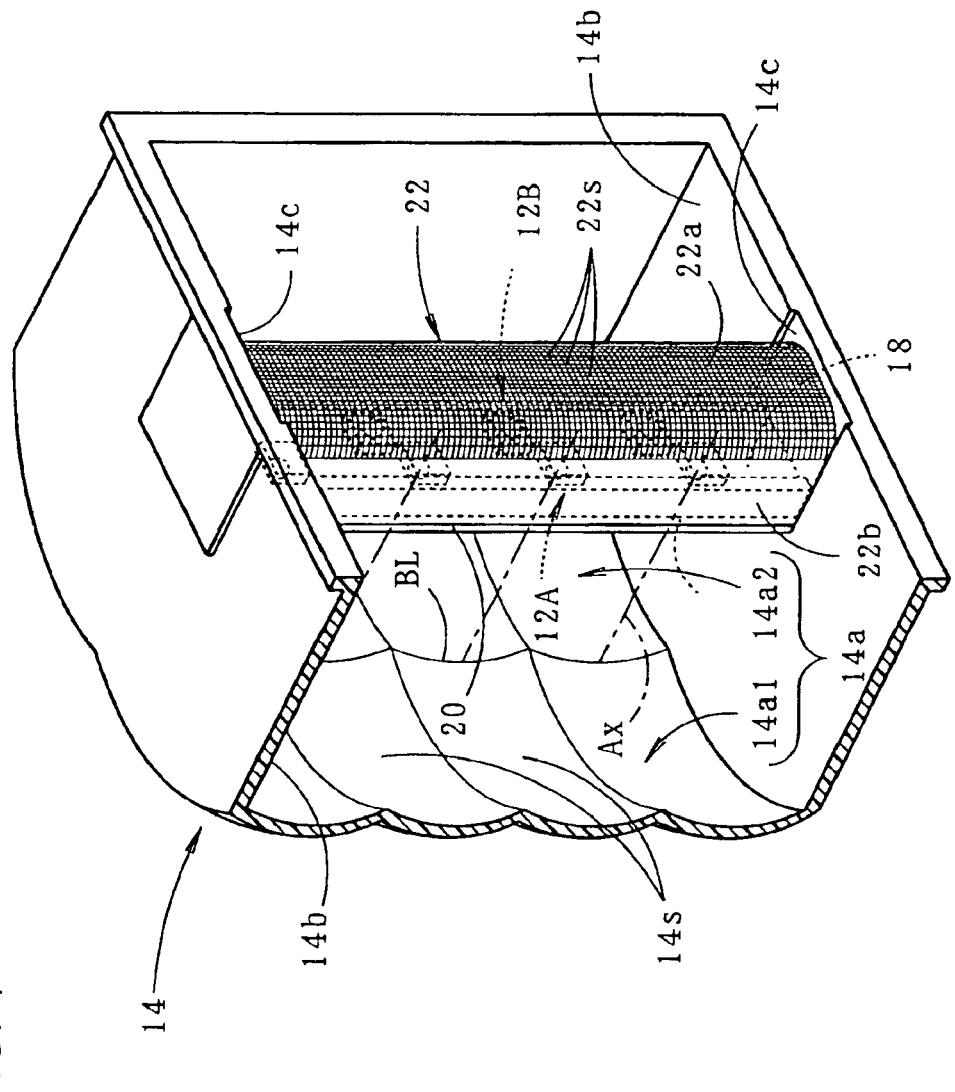
FIG. 4 is a perspective cross sectional view of the vehicular lamp with its translucent cover removed.

As seen from FIG. 4 that shows the vehicular lamp 10 without the translucent cover 16, the first LED light sources 12A are arranged in the vertical direction at equal intervals so that light of the first LED light sources 12A is radiated rearward of the lamp. Each of the first LED light sources 12A is supported by a circuit board 18 (see FIG. 3) that extends in the vertical direction. The circuit board 18 has a vertically-long rectangle shape and is secured to a circuit board supporting member 20.

The second LED light sources 12B are also arranged in the vertical direction at equal intervals so that light of second LED light sources 12B is radiated forward of the lamp. The second LED light sources 12B are arranged vertically, and each one of them is provided between the first LED light sources 12A (see FIG. 3). Each second LED light source 12B is secured also to the circuit board 18.

Figure 2:
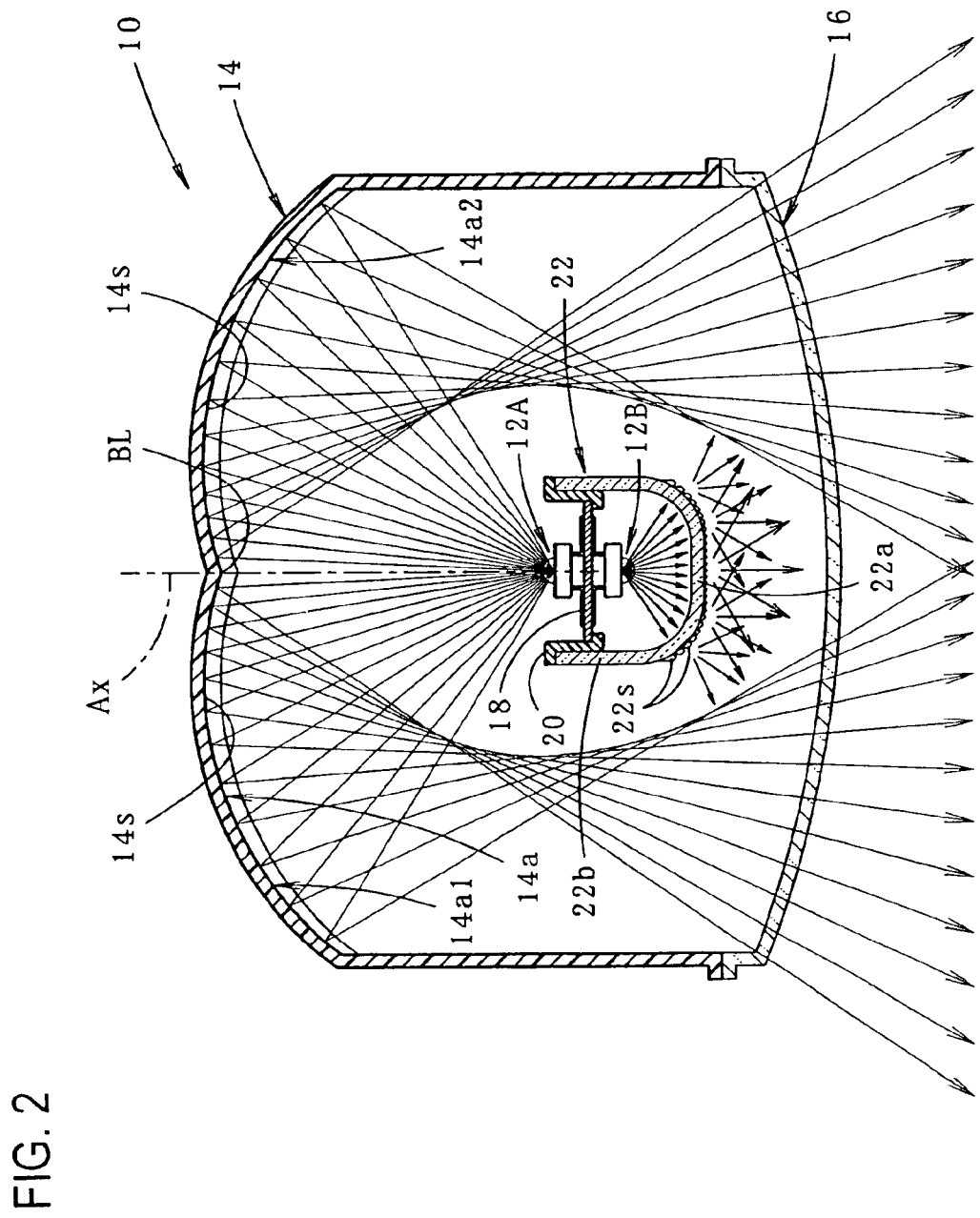
FIG. 2 is a cross sectional view taken along the line II—II in FIG. 1.

A cover member 22 that covers the circuit board 18 is, as best seen from FIG. 2, provided near the circuit board 18 so as to be on the front side of the lamp. The cover member 22 is a synthetic resin molded product and has a substantially U-shaped horizontal cross section. The member 22 is secured to the circuit board supporting member 20 so that its straight side portions 22b are directed in the front-rear direction of the lamp 10. As seen form FIG. 3, upper and lower end portions of the circuit board supporting member 20 and the cover member 22 are respectively fixed to a positioning concave portion 14c provided on upper and lower walls 14b of the reflector 14.

A plurality of diffusion lens elements 22s are provided entirely over the front surface 22a of the cover member 22. With these diffusion lens elements 22s, light from each one of three second LED light sources 12B is transmitted and diffused forward of the lamp. Each diffusion lens element 22s is a convex lens allocated in each one of the segments that are finely defined in a lattice-like manner.

The reflective surface 14a of the reflector 14 is, as best seen from FIG. 2, divided into two reflecting areas 14a1 and 14a2 so that these areas are located on right and left sides of a boarder line BL that extends in the vertical direction of the reflector 14. The boarder line BL is positioned exactly behind an imaginary vertical line that connects four first LED light sources 12A, so that the irradiation angle from each of the first LED light sources 12A is evenly divided into two sections in the lateral (right and left) direction. The reflecting areas 14a1 and 14a2 are laterally symmetrical in shape with respect to the boarder line BL.

Furthermore, as best seen from FIGS. 3 and 4, each of the reflecting areas 14a1 and 14a2 is divided (horizontally) into a plurality of (four in the shown embodiment) sub-reflective surfaces 14s so that each sub-reflective surface 14s positionally corresponds to each one of the first LED light sources 12A.

More specifically, each one of the plurality of sub-reflective surfaces 14s has the same configuration. Namely, the outer shape of each of the sub-reflective surfaces 14s is, as best seen from FIG. 4, horizontally-long rectangle when viewed from the front of the lamp. Each one of the sub-reflective surfaces 14s has a concave surface that has a larger curvature than a paraboloid of revolution whose focal point is each one of four first LED light source 12A while taking a light axis Ax that extends in the longitudinal direction through each first LED light source 12A as the central axis. With this configuration of the sub-reflective surfaces 14s, light from each of four first LED light sources 12A is converged in the vertical and lateral directions once and then diffused to reflect forward of the lamp.

Figure 5:
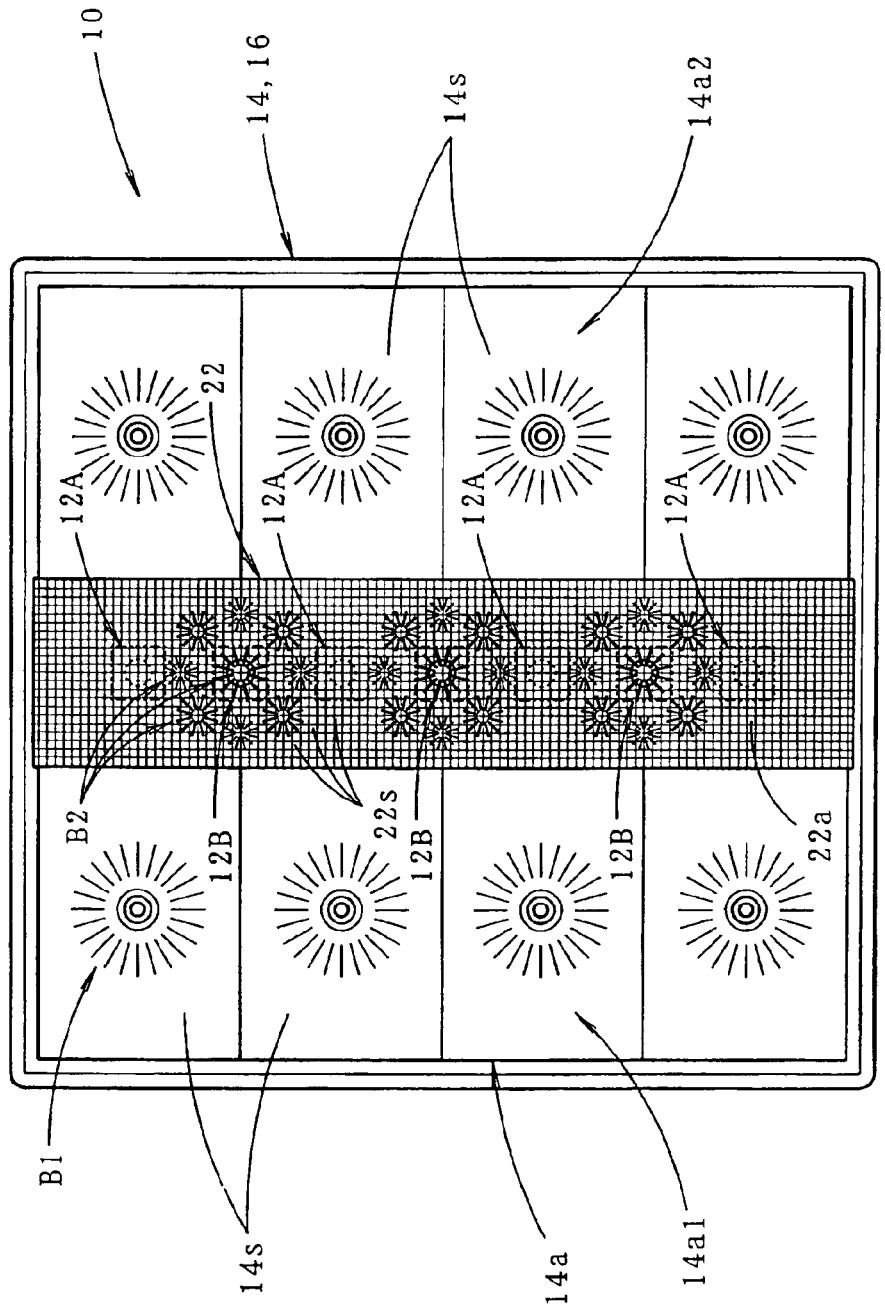
FIG. 5 is a front elevational view of the vehicular lamp with its first and second LED light sources being lit.

FIG. 5 shows the vehicular lamp 10 with its first and second LED light sources 12A and 12B lit.

As seen from FIG. 5, when the vehicular lamp 10 with its first and second LED light sources 12A and 12B lit is viewed from the front, not only each sub-reflective surface 14s of the reflective surface 14a of the reflector 14 but also the front portions of the cover member 22 that correspond to the second LED light sources 12B appear to illuminate.

In this case, since each sub-reflective surface 14s has a concave surface as described above, the sub-reflective surface 14s appears, as an illuminating portion B1, to provide a soft lighting effect that has a relatively wide scope around the center thereof. On the other hand, since the cover member 22 has the diffusion lens elements 22s on its front surface 22a, the cover member 22 appears, as a plurality of illuminating portions B2 distributed around the positions right in front of each first LED light source 12, to emit light brilliantly at the frontal portion of each of the second LED light sources 12B by the light diffused and transmitted from each of the diffusion lens elements 22s.

Even when the lamp is viewed from a slightly offset or shifted position, each sub-reflective surface 14s appears to be lit around a portion that is offset from the central portion thereof according to the amount of shift of the view point. On the other hand, the frontal portion of each second LED light source 12B appears, through the cover member 22, to be lit around the portion that is offset from the position right in front of the first LED light source 12 according to the amount of shift of a view point.

As described in detail above, in the vehicular lamp 10 of the shown embodiment, light from the plurality of first LED light sources 12A that are disposed to face the back of the lamp is reflected forward of the lamp by the reflector 14, the second LED light sources 12B are disposed near the circuit board 18, which supports the first LED light sources 12A, so as to face the front of the lamp, and the transparent cover member 22 that covers the circuit board 18 is provided near the front side of the second LED light sources 12B. In addition, the cover member 22 is formed with a plurality of diffusion lens elements 22s that diffuse and transmit light from the second light sources 12B. Accordingly, the vehicular lamp 10 has such advantages as described below.

Since the light from the first LED light sources 12A is radiated forward of the lamp by being reflected by the reflector 14, the lamp appears to provide soft lighting by an indirect lighting effect. On the other hand, since the light from the second LED light sources 12B is radiated, as direct light, forward of the lamp through the plurality of diffusion lens elements 22s of the cover member 22, some portions of the lamp (that correspond to the second LED light sources 12B) appears to illuminate brilliantly. In addition, since the portion that illuminates brilliantly is at a distance from the reflective surface 14a of the reflector 14 on the front side of the lamp, the lamp appears to illuminate in a streoscopic manner. Thus, the lamp appears to be lit from deep inside. Furthermore, since the light from the first LED light sources 12A and the light from the second LED light sources 12B are both radiated forward of the lamp, a sufficient light emission amount is ensured.

Further, since the cover member 22 has a plurality of diffusion lens elements 22s, when the lamp is not lit, the presence of not only the second LED light source 12B but also the first LED light source 12A cannot be seen from the outside of he lamp. Thus, the manner in which the lamp illuminates when it is lit is difficult to expect, and the manner in which the lamp appears can change unexpectedly when the lamp is turned on and off, thus enhancing the novelty of the lamp design.

Further, the circuit board that supports the first LED light source 12A and the circuit board that supports the second light source 12B are the common circuit board 18. Accordingly, the number of parts is reduced, and a space necessary to arrange the first and second LED light sources 12A and 12B can be minimized.

In addition, since the first and second LED light sources are arranged vertically in lines, and the cover member 22 having a substantially U-shaped cross section is provided so as to extend in the vertical direction, the light emission amount of the lamp is high, and the circuit board 18 for the first and second LED light sources 12A and 12B can be formed in a simple rectangular shape.

In the shown embodiment, the reflective surface 14a of the reflector 14 is divided into two reflecting areas 14a1 and 14a2 on both sides of the boarder line BL, and each of the reflecting areas 14a1 and 14a2 is divided into a plurality of sub-reflective surfaces 14s so that each sub-reflective surface 14s positionally corresponds to each one of the first LED light sources 12A. Accordingly, light from each first LED light source 12A can be appropriately reflected by each sub-reflective surface 14s on both sides of the light source, and a larger amount of light flux is assuredly directed toward the front of the lamp. Furthermore, since each one of the reflecting areas 14a1 and 14a2 is divided into a plurality of sub-reflective surfaces 14s for each one of the first LED light sources 12A, the first LED light sources 12A, when viewed from the front of the lamp, appear to be lit twice as much by the sub-reflective surfaces 14s on both sides of the cover member 22.

Particularly, in the above embodiment, since the border line BL on the reflective surface 14a is positioned so as to divide the irradiation angle of each one of the LED light sources 12 into two (right and left) sections, the reflecting areas 14a1 and 14a2 on both sides of the boarder line BL appear with equally intensive of light.

Moreover, since each one of the sub-reflective surfaces 14s of the reflecting areas 14a1 and 14a2 converges light from each one of the first LED light sources 12A vertically and laterally once and then diffuses it, the light reflected from the sub-reflective surfaces 14s is prevented from being directed toward the circuit board 18, the circuit board supporting member 20, or the cover member 22. Accordingly, a loss in light flux of the reflected light is prevented.

Also, in the shown embodiment, since the first and second LED light sources 12A and 12B are disposed alternately in the vertical direction, the portion that illuminates brilliantly and the portion that provides a soft lighting effect are disposed alternately when the lamp is viewed from the front. The lamp, when it is lit, has unprecedented novelty in lamp design.

Though the reflector 14 and the translucent cover 16 form the lamp chamber in the embodiment described above, another type of lamp configuration can be made. For instance, the reflector can be provided inside a lamp chamber that is made by a lamp body and a translucent cover. In this structure, too, the same effects as that of the above-described embodiment are obtained.

Also, in the above embodiment, the description is made on the vehicular lamp 10 which is a tail lamp. However, the same effects as that of the above-described embodiment can be obtained for other types of vehicular lamps such as a stop lamp and a clearance lamp as long as the same configuration as that of the above-described embodiment is employed. For instance, when a tail and stop lamp is the vehicular lamp 10, then only the first LED light sources 12A are lit in its tail lamp illumination mode, and both the first and second LED light sources 12A and 12B are lit simultaneously in its stop lamp illumination mode.

What is claimed is:

1. A vehicular lamp comprising at least one first LED light source provided so as to face a rear of said vehicular lamp and reflector that reflects light from said first LED light source forward of said vehicular lamp, said vehicular lamp further comprising:
   at least one second LED light source that faces a front of said vehicular lamp, said second LED light source being provided near a front side of a circuit board that supports said first LED light,
   a transparent cover member provided near said front side of said second LED light source, said transparent cover member covering circuit board that supports said second LED light source and said circuit board that supports said first LED light source; and wherein
   a plurality of diffusion lens elements are formed on said cover member so as to disuse and transmit light from said second LED light source; and
   light from said second LED source is radiated forward of the vehicle lamp as direct light transmitted through the plurality of diffusion lens elements.

2. A vehicular lamp according to claim 1, wherein a common circuit board is used for said circuit board that supports said first LED light source and for said circuit board that supports said second LED light source.

3. A vehicular lamp according to claim 2, wherein said first and second LED light sources and respectively disposed at a plurality of location in a same direction, and said cover member has a substantially U-shaped cross section and is provided so as to extend in an arrangement direction in which said first and second LED light sources are disposed.

4. A vehicular amp according to claim 3, wherein a reflective surface of said reflector is divided into two reflecting areas by a boarder line that extends substantially in parallel to said arrangement direction, and each of said reflecting areas are divided into a plurality of sub-reflective surfaces for each of first LED sources.

5. A vehicular lamp according to claim 4, wherein said first and second LED light sources provided alternatively along said arrangement direction.

6. A vehicular lamp according to claim 5, wherein a plurality of diffusion lens elements formed on said cover member so as to diffuse and transmit light from said second LED light source.

7. A vehicular lamp according to claim 1, wherein said first and second led light sources and respectively disposed at a plurality of location in a same direction, and said cover member has a substantially u-shaped cross section and is provided so as to extend in an arrangement direction in which said first and second led light sources are disposed.

8. A vehicular lamp according to claim 7, wherein a reflective surface of said reflector is divided into two reflecting areas by a boarder line that extends substantially in parallel to said arrangement direction, and each of said reflecting areas are divided into a plurality of sub-reflective surfaces for each of first LED light sources.

9. A vehicular lamp according to claim 8, wherein said first and second led light sources provided alternatively along said arrangement direction.

* * * * *